(12) United States Patent
Walance et al.

(10) Patent No.: US 6,751,253 B1
(45) Date of Patent: Jun. 15, 2004

(54) COMMUNICATION PORT-POWERED DIGITAL COMMUNICATION INTERFACE FOR UPGRADING SOFTWARE-RECONFIGURABLE TEST SET

(75) Inventors: Robert B. Walance, Newbury Park, CA (US); John L. Milligan, Camarillo, CA (US); Roy A. Milligan, Newbury Park, CA (US)

(73) Assignee: Harris Corporation, Melbourne, FL (US)

( * ) Notice: Subject to any disclaimer, the term of this patent is extended or adjusted under 35 U.S.C. 154(b) by 0 days.

(21) Appl. No.: 09/543,171

(22) Filed: Apr. 5, 2000

(51) Int. Cl.[7] .............................. H04B 1/38; H04M 1/24; H04M 3/22
(52) U.S. Cl. ..................... 375/220; 375/377; 379/21; 379/27.07
(58) Field of Search ................... 375/220, 222, 375/224, 377; 379/21, 27.07, 93.05, 93.06, 93.36, 142.13, 142.15, 413.02, 413.03, 27.01, 29.01

(56) References Cited

U.S. PATENT DOCUMENTS

| | | | |
|---|---|---|---|
| 5,224,154 A | * | 6/1993 | Aldridge et al. ......... 379/93.36 |
| 5,369,687 A | * | 11/1994 | Farkas ..................... 379/93.36 |
| 5,377,259 A | | 12/1994 | Butler et al. ................. 379/93 |
| 5,473,552 A | | 12/1995 | Chen et al. ................ 364/514 |
| 5,896,415 A | | 4/1999 | Owens et al. .............. 375/224 |
| 6,192,125 B1 | * | 2/2001 | Norsworthy et al. ..... 379/93.05 |

* cited by examiner

Primary Examiner—Betsy L. Deppe
(74) Attorney, Agent, or Firm—Allen, Dyer, Doppelt, Milbrath & Gilchrist, P.A.

(57) ABSTRACT

A digital communication interface for downloading software for upgrading the functionality of a telephone craftsperson's butt-in test set is configured to be powered externally by respectively different voltages ported from the host computer and the test set. Digital communication connectivity for software upgrade signals sourced from the host computer for delivery to the control processor of the test set, and for communication signals sourced from the test set for delivery to the host computer, is effected by a pair of opto-isolators which provide signal integrity isolation between the respectively different parameters of the host computer and the test set.

2 Claims, 2 Drawing Sheets

COMMUNICATION PORT-POWERED DIGITAL COMMUNICATION INTERFACE FOR UPGRADING SOFTWARE-RECONFIGURABLE TEST SET

FIELD OF THE INVENTION

The present invention relates in general to telecommunication systems and equipment therefor, and is particularly directed to a new and improved test set interface, through which software for reconfiguring or upgrading the functionality of a telephone craftsperson's butt-in test set may be downloaded into the butt set. Advantageously, the interface is configured to be powered externally by the communication paths to which it is connected, so as to obviate the need for an internal power source, and allow it to be packaged as a self-contained compact, plug-in module.

BACKGROUND OF THE INVENTION

Accompanying the continuing and rapid-paced advances in telecommunications technology is the need to upgrade or reconfigure a variety of equipment and system components. To accommodate this requirement, while avoiding a wholesale replacement of the internal electronics, currently manufactured device implementations customarily include a software-upgradable micro-controller as their principal functionality determining component. As a non-limiting example, FIG. 1 diagrammatically illustrates a programmable butt-in telephone test set (or butt set) 10, having of a user interface 11 (including a keypad, associated display and audio transceiver components), through the operation of which a telephone craftsperson may test the operation of a variety of telephone circuits, including those associated with both analog (plain old telephone service) or POTS and digitally formatted communication services.

As is further shown in the reduced complexity functional diagram of FIG. 2, in addition to including a communication port 12 and associated telco interface circuit 13, through which the butt set 10 is connectable to (e.g., bridged onto tip and ring leads of) a line (e.g., copper wireline pair) 14 under test, the butt set also includes a digital communication port 16 (such as an RS-232 port) and an associated digital signaling interface circuit 17, through which digital communications (including those associated with software upgrades) with the test set's resident control processor 18 may be conducted, typically from a host workstation (e,.g., personal computer (PC)) 20.

Since respective electrical parameters (e.g., respective voltage levels) of the digital communication signals employed by the host workstation and butt set are not necessarily the same (and can be expected to be directly incompatible) and, moreover, since the test set may be powered by a relatively large DC voltage of a telephone line, it is necessary to provide isolation circuitry between the two units that ensures both safety of operation and maintains the proper signal integrity across the link. Because this circuitry is typically complex and powered by a self-contained or externally connected power source, it is not only a relatively cumbersome piece of equipment, but is costly to manufacture and maintain.

SUMMARY OF THE INVENTION

In accordance with the present invention, these problems are effectively obviated by a compactly packaged, electro-optical firewall-based, digital communication interface, which is configured to not only provide digital communications between the host computer and the butt set (including but not limited to the downloading of software), but to draw its power from the respective butt set and PC communication paths to which it is connected, and thereby eliminate the need for a power source of its own.

To this end, the butt set interface of the present invention includes a first set of host-associated ports that are adapted to be coupled to an auxiliary (serial) communication port of the host computer, and a second set of butt set-associated ports that are adapted to be coupled to a programmable craftsperson's telephone butt set. These two sets of ports are coupled to the internal voltage translation and throughput—isolation circuitry of the test set. This circuitry includes a pair of host and butt set sub-circuits that are configured to be coupled to and translate voltage levels supplied from each of the host and butt set to those needed by the internal circuit components of the interface, and to provide opto-electronic firewalls in digital communication paths therethrough. Since this obviates the need for an internal power source, it allows the interface to be readily packaged as a self-contained module, having respective plug-in connectors for each of the host and butt-set associated interface ports.

The host-side ports of the test set interface include a pair of power ports and a pair of (transmit and receive) digital communication ports. One of the power ports is coupled to ground; the other power port is coupled to receive a serial DTR signal from the host computer, and serves as first source of DC voltage that is translated into a second DC voltage employed by host-associated circuit components of the interface. The host-side transmit digital communication port is coupled through a host-to-butt set opto-electronic coupler (opto-isolator) and output buffer amplifier to a shared, bidirectional digital communication port on the butt set side of the interface. This opto-electronic coupler provides host-to-butt set signal throughput for and a signal integrity firewall between the host and butt set ports of the interface. The output circuitry of this opto-electronic coupler, associated with the butt set side of the interface, is powered by a DC voltage derived from the butt-set.

The host-side transmit digital communication port is further coupled to a one-shot circuit, which is used to controllably enable a butt set-host opto-electronic coupler (opto-isolator). This butt set-to-host opto-electronic coupler provides butt set-to-host signal throughput for, and a signal integrity firewall for digital communication signals from the butt set to the host. The one-shot is operative to disable the butt set-host opto-electronic coupler during host-to-butt set communications, and thereby prevent host-to-butt communication signals applied to the host side digital input port from being looped back to the host side digital output port.

The butt set interface ports include a pair of power ports and a bidirectional digital communication port. One butt set side power port is coupled to ground, while the second butt set side power port is coupled to receive a DC voltage from the butt set, and serves as second source of DC voltage required by butt set associated components of the circuitry of the interface. The bidirectional digital communication port is coupled through respective buffer amplifiers to the two opto-isolators.

When the interface has its plug-in connectors for the host and butt-set interface ports coupled to corresponding power—communication ports of the host processor and butt set, it draws power from and internally generates a set of DC voltages required by the internal circuits of the host side and butt set side portions of the interface. For digital communications in the host-to-butt set direction, as in the case of a performing a software upgrade to the butt set from the host, signals applied to the digital communication port are coupled to the host-to-butt set opto-isolator and to the one-shot. The opto-isolator provides host-to-butt set signal throughput and signal integrity isolation between the host and the butt set, while the one-shot circuit disables the other (butt set-host) opto-isolator, to prevent the incoming host-to-butt communication signals from being looped back to the host through the other opto-electronic coupler. Butt set-sourced digital communications are coupled through the butt set-to host opto-isolator to the butt set-to-host digital output port for delivery to the host.

DETAILED DESCRIPTION

Before describing in detail the new and improved butt set interface of the present invention, it should be observed that the invention resides primarily in a modular arrangement of conventional communication circuits and components. In terms of a practical implementation that facilitates its manufacture as a printed circuit-based package, this modular arrangement may be readily implemented as an application specific integrated circuit (ASIC) chip set. As a consequence, the circuit configuration of this arrangement and the manner in which it is interfaced with a craftsperson's butt set and a host computer have been illustrated in a readily understandable block diagram and schematic format, which shows only those specific details that are pertinent to the present invention, so as not to obscure the disclosure with details that are readily apparent to one skilled in the art having the benefit of present description.

Figure 1:
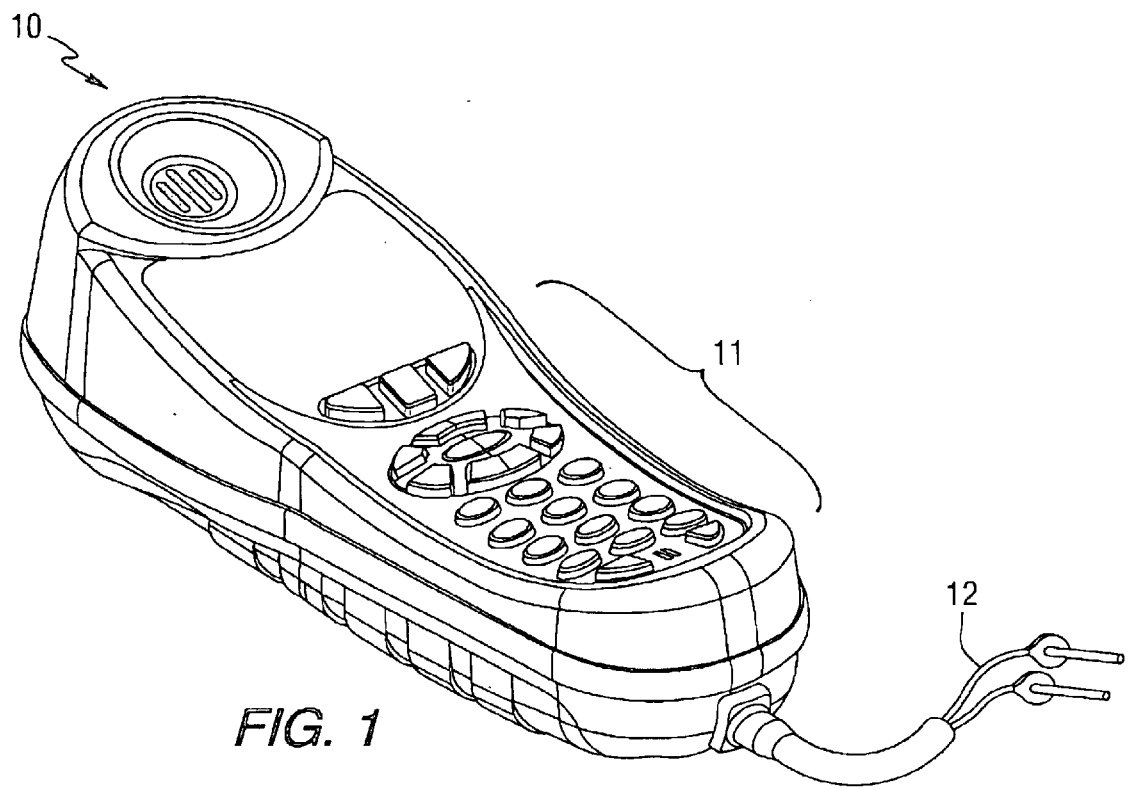
FIG. 1 diagrammatically illustrates a digitally programmable butt-in test set.
Figure 2:
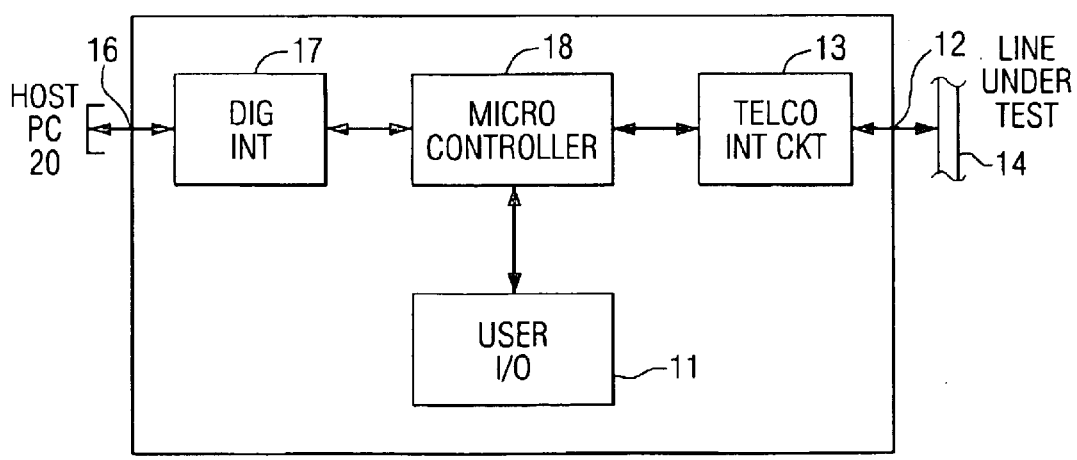
FIG. 2 is a reduced complexity functional diagram of the internal circuitry architecture of the butt set of FIG. 1.
Figure 3:
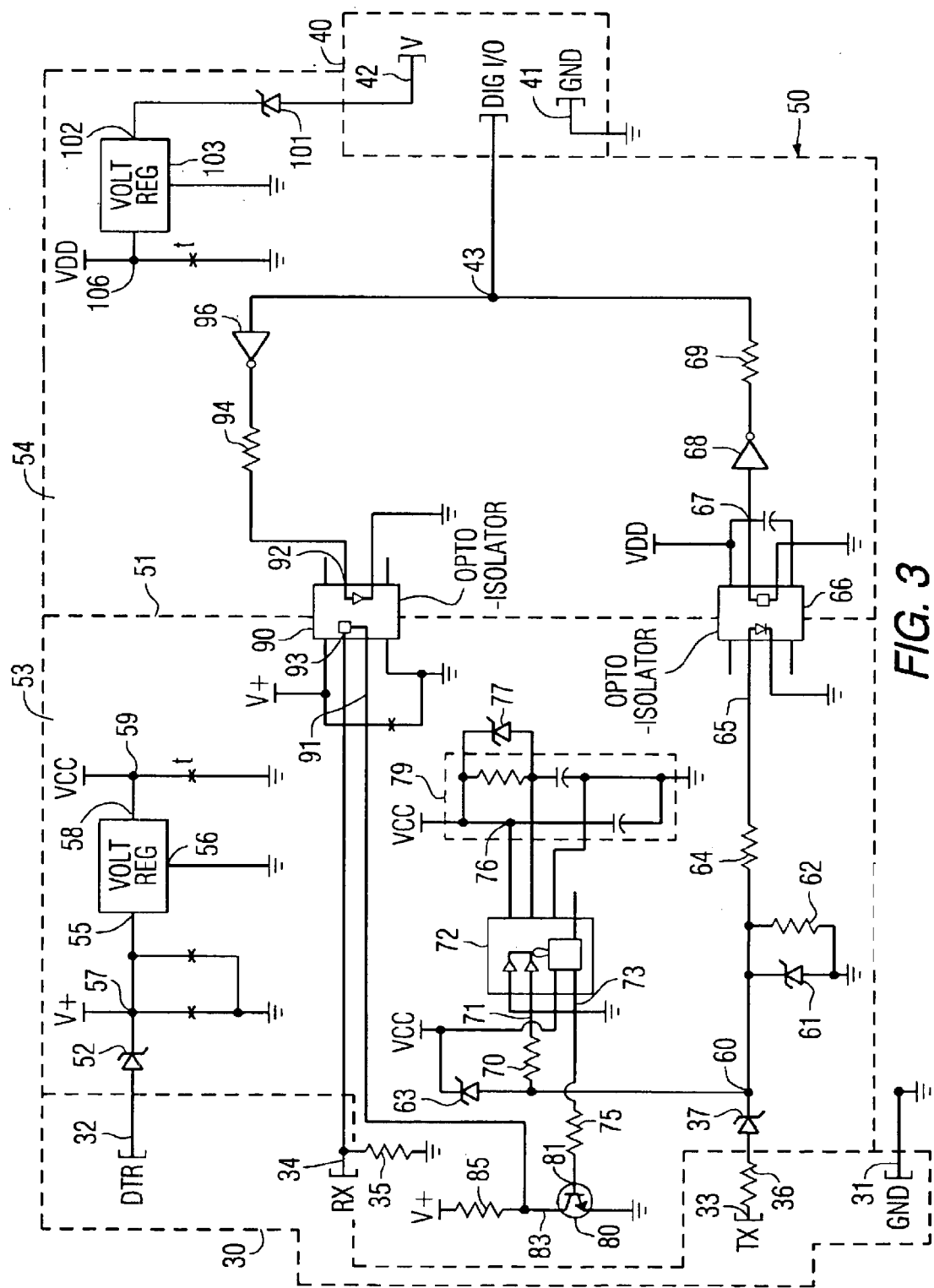
FIG. 3 is a schematic illustration of the digital communication butt set interface of the present invention.

Attention is now directed to FIG. 3, which diagrammatically illustrates a non-limiting embodiment of the butt set interface of the present invention as comprising a first set of 'host interface' ports 30, that are adapted to be coupled to an auxiliary (serial) communication port of the host computer, and a second set of 'butt set' interface ports 40, that are adapted to be coupled to a programmable craftsperson's telephone butt set. As a non-limiting example, such a butt set may comprise a TS 45 test set manufactured by Harris Corp., Camarillo, Calif.

These two sets of host and butt-set associated interface ports are coupled to voltage translation and throughput—isolation circuitry 50, which is configured to be coupled to and translate voltage levels supplied from each of the host and butt set to those needed by the internal circuit components of the interface, and to. provide an opto-electronic firewall in each of a pair of digital communication paths therethrough. In the schematic diagram of FIG. 3, the voltage translation and throughput—isolation circuitry 50 may be effectively subdivided by broken line 51 into a host-associated portion 53 and a butt-set associated portion 54. As pointed out above, because the test set interface of the present invention requires no internal power source, it may be readily packaged as a self-contained module, having respective plug-in connectors for each of the host and butt-set associated interface ports 30 and 40.

On the host side 53, the host interface ports 30 include a pair of power ports 31 and 32 and a pair of digital communication ports 33 and 34. Power port 31 is coupled to ground, while power port 32 is coupled to receive the serial DTR signal from the host computer, and serves as first source of DC voltage required by host communication-associated circuit components of the interface. For this purpose, the power port 32 is coupled through a Schottky diode 52 to the input 55 of a DC voltage regulator 56, and to a first voltage terminal 57, from which a first DC voltage V+ employed by host-associated circuit components of the interface is derived. The output 57 of the DC voltage regulator 56 is coupled to a second voltage terminal 59, from which a second DC voltage VCC employed by circuitry associated with the host side of the interface is derived. Each of the DC voltage terminals 57 and 59 is capacitively coupled to ground for high frequency noise rejection.

The host side digital communication port 33 serves as a host-to-butt set digital input or transmit port, while the host side digital communication port 34 serves as a butt set-to-host digital output or receive port. In particular, the digital input port 33 is coupled through a resistor 35 and Schottky diode 37 to a node 60. Node 60 is referenced to ground through a Schottky diode 61 and a parallel resistor 62, and to VCC through a Schottky diode 63. Node 60 is further coupled through a resistor 64 to the input port 65 of a first (host-to-butt set) opto-electronic coupler 66.

Opto-electronic coupler 66 has its output 67 coupled through a buffer amplifier 68 and resistor 69 to a shared, bidirectional digital communication port 43 on the butt set side of the interface. The host-to-butt set opto-electronic coupler 66 is operative to provide host-to-butt set signal throughput for and voltage isolation between the host and butt set ports of the interface. The output circuitry of the opto-electronic coupler 66 (which is associated with the butt set side of the interface) is powered by a DC voltage VDD, employed by butt-set interfacing components of the test set interface.

Node 60 is further coupled through a resistor 70 to the reset input 71 of a monostable multivibrator or one-shot circuit 72, which has an output 73 coupled through a resistor 75 to the base 81 of a common emitter transistor 80, the collector 83 of which is biased through resistor 85 to supply voltage V+, and which is coupled to an enable input 91 of a second (butt set-host) opto-electronic coupler 90. The butt set-to-host opto-electronic coupler 90 is operative to provide butt set-to-host signal throughput for, and voltage isolation between, the butt set and host ports of the interface.

The time constant of the one-shot circuit 72 is derived by means of an RC network 79 coupled to node 76 and including Schottky diode 77 coupled between VCC and ground. One-shot circuit 72 is triggered by a digital signal applied to port 33 and thereby to node 60, and is operative to disable the (butt set-host) opto-electronic coupler 90 during host-to-butt set communications. This prevents host-to-butt communication signals applied to the digital input port 33 from being looped back to the output port 34 through opto-electronic couplers 66 and 90, each of which is coupled to the butt set side digital communication port 43.

It should be noted that alternative communication port connections different that those shown in FIG. 3 may be employed in accordance with type of signaling and power supply connections provided by the host and butt set. For example, the butt set side bidirectional port 43 may be configured as a pair of transmit and receive communication ports, as are ports 33 and 34 on the host side of the interface. In this alternative (full duplex) signal path configuration, circuitry for controllably disabling either opto-isolator is unnecessary, so that one-shot 72 and its output driver circuitry to opto-isolator 90 may be removed.

Conversely, wherein both the host side of the interface and the butt set side of the interface employ bidirectional ports, respective one-shots and associated output drivers may be coupled to controllably enable each opto-isolator, to prevent loopback, as described above. In a further alternative configuration, where the communication port configuration of FIG. 3 is reversed, namely, the host side has a single communication port and the butt set side has a pair of transmit and receive ports, the input of one-shot 72 would be coupled instead to the butt-set side transmit side and its output coupled through driver circuitry to the enable input of opto-isolator 66.

The output circuitry (associated with the host side of the interface) of the butt set-to-host opto-electronic coupler 90 is powered by the supply voltage V+derived from the voltage terminal 57, referenced above, and has its output 93 coupled to the butt set-to-host digital output port 34, which is referenced to ground through resistor 35. Opto-electronic coupler 90 has input terminal 92 thereof coupled via resistor 94 to the output of a buffer amplifier 96, the input of which is coupled to the butt set side bidirectional communication port 43.

The butt set interface ports 40 include a pair of power ports 41 and 42 and the bidirectional digital communication port 43. Port 41 is coupled to ground, while power port 42 is coupled to receive a DC voltage from the butt set, and serves as second source of DC voltage required by butt set associated components of the circuitry of the interface. For this purpose, the power port 42 is coupled through a Schottky diode 101 to the input 102 of a DC voltage regulator 103. The output 105 of the DC voltage regulator 103 is coupled to a voltage terminal 106, from which a third DC voltage VDD, employed by butt set-associated components of the interface, is derived. For high frequency noise rejection, voltage terminal 106 is capacitively coupled to ground, as shown.

In operation, with respective plug-in connectors for the host and butt-set interface ports 30 and 40 coupled to corresponding power—communication ports of the host processor and butt set, as described above, the above-described voltages V+, VCC, VDD and ground (GND) will be supplied to the internal circuits of the host side and butt set side portions 53 and 54 of the interface. For digital communications in the host-to-butt set direction, such as in the case of a performing a software upgrade from the host to a stored program previously installed in the microcontroller of the butt set, host-sourced digital communication signals applied to the digital communication port 33 are coupled via node 60 to each of opto-electronic coupler 66 and one-shot 72.

As opto-electronic coupler 66 provides host-to-butt set signal throughput and signal integrity isolation between the host port 33 and the bidirectional butt set port 43, the one-shot circuit 72 is triggered by the digital communication signal from the host, so as to disable the (butt set-host) opto-electronic coupler 90, and prevent the incoming host-to-butt communication signals at input port 33 from being looped back to the output port 34 through opto-electronic coupler 90, which is coupled to the butt set digital communication port 43. For the case of communication signals sourced from the butt set, such as a reply message to a message sourced from the host, or a message initiated by the user operating the keypad of the butt set, digital communication signals applied to port 43 from the butt set are coupled through the opto-electronic coupler 90 to the butt set-to-host digital output port 34 for delivery to the host.

From the foregoing description, it can readily be seen that the digital communication test set interface of the present invention provides a very practical mechanism for providing digital communication connectivity between the host computer and a telephone craftsperson's butt set. The interface of the invention not only provides a protective firewall for downloading software into the test set, but draws its power from the host and butt set, and thereby eliminates the need for an internal power source, so that the interface may be packaged as a self-contained compact, plug-in module.

While we have shown and described an embodiment in accordance with the present invention, it is to be understood that the same is not limited thereto but is susceptible to numerous changes and modifications as known to a person skilled in the art. We therefore do not wish to be limited to the details shown and described herein, but intend to cover all such changes and modifications as are obvious to one of ordinary skill in the art.

What is claimed is:

1. A communication interface for coupling a portable telephone test set, containing a control processor therefor that is configured to be interfaced with and conduct testing of a telephone communication circuit, with a host computer that is operative to supply communication signals in the form of a software upgrade to an operational control program stored in said control processor of said portable telephone test set, said communication interface comprising:

a first connector that is adapted to be coupled to said portable telephone test set, and providing access to, and deriving operational power exclusively from, a communication path of said portable telephone test set, said first connector having a single bidirectional communication port configured to provide bidirectional digital communication signal connectivity with said portable telephone test set;

a second connector that is adapted to be coupled to said host computer, and providing access to, and deriving operational power exclusively from, a communication path of said host computer, said second connector having separate transmit and receive ports configured to provide separate digital communication signal connectivity to and from said host computer;

a first isolator, coupled between said transmit port and said single bidirectional communication port, and being operative to provide voltage level-isolated, digital communication connectivity therethrough for communication signals sourced from said host computer for delivery to said portable telephone test set;

a second isolator, coupled between said receive port and said single bidirectional communication port, and being operative to provide voltage level-isolated, digital communication connectivity therethrough for communication signals sourced from said portable telephone test set for delivery to said host computer; and an isolator controller, responsive to communication signals sourced from said host computer for delivery to said portable telephone test set, for preventing said second isolator from providing digital communication connectivity from said single bidirectional communication port therethrough.

2. A method of supplying a software upgrade from a host computer to a programmable portable telephone test set having a control processor into which operational control software employed by said programmable portable telephone test set is installable, said method comprising the steps of:

(a) coupling, to said programmable portable telephone test set, a first connector that is operative to provide access to, and derive operational power exclusively from, a communication path of said programmable portable telephone test set, said first connector having a single bidirectional communication port that is configured to provide bidirectional digital communication signal connectivity with said programmable portable telephone test set;

(b) coupling, to said host computer, a second connector that is operative to provide access to, and derive operational power exclusively from, a communication path of said host computer, said second connector having separate transmit and receive ports configured to provide separate digital communication signal connectivity to and from said host computer;

(c) coupling a first isolator between said transmit port and said single bidirectional communication port, said first isolator being operative to provide voltage level-isolated, digital communication connectivity therethrough for communication signals sourced from said host computer for delivery to said programmable portable telephone test set;

(d) coupling a second isolator between said receive port and said single bidirectional communication port, said second isolator being operative to provide voltage level-isolated, digital communication connectivity therethrough for communication signals sourced from said programmable portable telephone test set for delivery to said host computer; and (e) in response to communication signals sourced from said host computer for delivery to said programmable portable telephone test set, preventing said second isolator from providing digital communication connectivity from said single bidirectional port therethrough.

* * * * *